United States Patent [19]
Pap

[11] 3,831,348
[45] Aug. 27, 1974

[54] REMOVAL OF SULFUR COMPOUNDS FROM GLYCOLIC AND ALCOHOLIC COMPOUNDS BY SOLVENT EXTRACTION

[75] Inventor: Geza Pap, Irvington, N.J.

[73] Assignee: Allied Chemical Corporation, New York, N.Y.

[22] Filed: July 9, 1971

[21] Appl. No.: 161,036

[52] U.S. Cl. .................. 55/73, 423/220, 423/226
[51] Int. Cl. .................................... B01d 11/04
[58] Field of Search .......... 55/73, 68, 37; 23/312 R, 23/312 S; 423/220, 226

[56] References Cited
UNITED STATES PATENTS

| | | | |
|---|---|---|---|
| 1,073,605 | 9/1913 | Hultman | 55/73 |
| 1,785,365 | 12/1930 | Seil | 55/73 |
| 1,946,489 | 2/1934 | Jahn | 55/73 |
| 2,139,375 | 12/1968 | Millar | 55/73 |
| 2,781,863 | 2/1957 | Bloch | 55/73 |
| 2,863,527 | 12/1958 | Herbert | 55/73 |
| 2,897,065 | 7/1959 | Capell | 23/312 S |
| 3,362,133 | 1/1968 | Kutscher | 55/73 |
| 3,495,933 | 2/1970 | Renault | 55/73 |
| 3,633,339 | 1/1972 | Wiewiorowski | 23/312 R |
| 3,664,091 | 5/1972 | Hegwer | 55/73 |

FOREIGN PATENTS OR APPLICATIONS

| | | | |
|---|---|---|---|
| 152,771 | 8/1953 | Australia | 55/73 |
| 728,444 | 4/1955 | Great Britain | 55/73 |

Primary Examiner—Norman Yudkoff
Assistant Examiner—S. J. Emery
Attorney, Agent, or Firm—Gerhard H. Fuchs; Arthur J. Plantamura

[57] ABSTRACT

A solvent extraction process for separating sulfur-bearing compounds from solutions thereof in solvents such as glycolic compounds, alcoholic compounds, or mixtures thereof, e.g., dialkyl ethers of polyalkylene glycols. The solvent extraction process involves the use of an extracting solvent consisting of (1) a water-immiscible liquid hydrocarbon compound which has a boiling temperature in the range of 50° F to 500° F and which is relatively highly miscible with sulfur-bearing compounds and (2) water. Specific water-immiscible hydrocarbons include chlorinated saturated or unsaturated hydrocarbon, aromatic hydrocarbon, chlorinated aromatic hydrocarbon, unsaturated oxygen-containing cyclic hydrocarbon, or mixtures thereof, e.g., trichloroethylene, benzene, toluene, furan, and monochlorobenzene. The sulfur-bearing solution is subjected to the extracting solvent within any solvent extraction system such that there exists the capabilities of lowering the sulfur content in the sulfur solution to a level substantially below 1 percent by weight of the solution.

10 Claims, 1 Drawing Figure

PATENTED AUG 27 1974
3,831,348
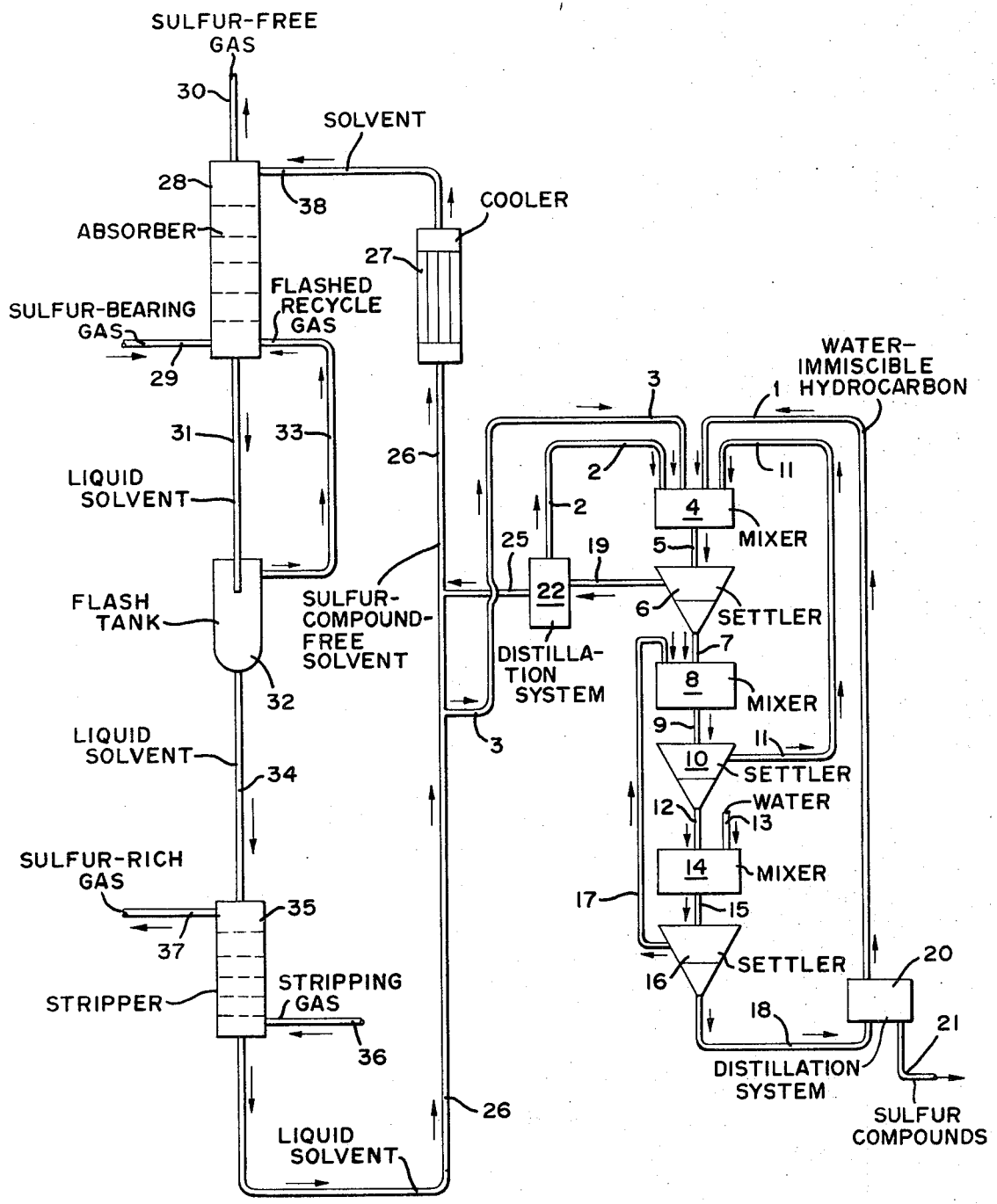
INVENTOR.
GEZA PAP
BY:
Arthur J. Plantamura
ATTORNEY.

3,831,348

REMOVAL OF SULFUR COMPOUNDS FROM GLYCOLIC AND ALCOHOLIC COMPOUNDS BY SOLVENT EXTRACTION

BACKGROUND OF THE INVENTION

This invention relates to a process for removing elemental sulfur and sulfur-bearing compounds (hereinafter the term "sulfur compounds" being used to signify both) from glycolic or alcoholic solutions containing sulfur compounds (hereinafter designated as "sulfur-beaning solutions"). In particular, the invention relates to a solvent extraction process for preventing sulfur compound build-up in alcoholic or glycolic solvents which are used as physical solvents in processes for sweetening gaseous mixtures by physically absorbing certain components, especially hydrogen sulfide, from the gaseous mixture. More particularly, the presence or build-up of certain sulfur compounds in certain sour gas mixtures may interfere with the efficiency of the alcoholic or glycolic solvent after an extended period of its use in removing designated gases such as hydrogen sulfide, carbon dioxide, and methane from the gaseous mixture because stripping of the alcoholic or glycolic solvent by known means may not liberate the desired levels of such designated gases. The invention is more particularly concerned with, but not limited to, a solvent extraction process for the regeneration of dialkyl ethers of polyalkylene glycols which are dealt with in U.S. Pat. Nos. 3,362,133 and 3,533,732.

Processes for treating and separating gases, especially hydrogen sulfide, from sour gas mixtures containing such gases are used in a number of chemical industries, especially the natural gas and substituted natural gas industry; these processes are used to alleviate the detrimental effect of these gases in some catalytic operations. However, research continues in this field because the known processes for removing such detrimental gases still have a number of disadvantages which will be referred to hereinafter. In processes involving the use of certain sour gas mixtures, it has been found that certain sulfur compounds may accumulate in the solvent which physically absorbs the aforementioned detrimental gases from the gaseous feed mixtures. Although the exact chemistry of the sulfur compound accumulation is not completely known, it is believed that some sulfur compounds in the gaseous feed mixture are oxidized and thereafter gradually inhibit the absorption capabilities of the physical solvent. These sulfur compounds continue to accumulate during the extensive use and reuse of the solvent as an absorbing medium. The accumulation of the sulfur compounds may significantly reduce the efficiency of the absorbing solvent to remove the said detrimental gases. In addition, the sulfur compounds may accumulate to a level wherein they eventually precipitate out of the solvent and deposit on process equipment such as pumps, piping, and heat exchangers. Accordingly, in such processes, it becomes advantageous to separate these sulfur compounds from the absorbing solvent, thereby regenerating the solvent for longer usage and precluding the necessity of replacing it periodically with fresh solvent. More specifically, in the process involving the separation of hydrogen sulfide from sour natural gas through the use of a glycol solvent, efficient absorption of hydrogen sulfide can be realized in an economic manner by removing substantially all of such sulfur compounds from the glycol absorbent solvent.

SUMMARY OF THE INVENTION

It is a primary object of the invention to provide a simple, efficient and economic process for the removal of sulfur compounds from sulfur-bearing solutions containing glycolic or alcoholic solvents. It is also an object to provide a solvent extraction process for the prevention of sulfur compound accumulation in glycolic or alcoholic solvents which were used previously for sweetening sour gas mixtures by absorbing the sulfur compound of the gaseous mixture. Further objects and advantages of the present invention will become apparent from the description of the invention which follows in greater detail, wherein parts and percentages are by weight unless otherwise specified.

These and other objects are accomplished according to our invention, wherein a solvent extraction process has been found that includes (a) contacting one part of a sulfur-bearing solution comprising glycolic solvents, alcoholic solvents, or mixtures thereof, and sulfur compounds with an extracting solvent consisting of (1) 0.05 to 1 part of a water-immiscible liquid hydrocarbon compound which has a boiling temperature in the range 50° F to 500° F, which is relatively highly miscible with sulfur compounds, and which hydrocarbon consists of a chlorinated saturated or unsaturated hydrocarbon, an aromatic hydrocarbon, a chlorinated aromatic hydrocarbon, an unsaturated oxygen-containing cyclic hydrocarbon, or mixtures thereof, which hydrocarbon compound is hereinafter designated as a water-immiscible hydrocarbon, and (2) 0.1 to 2 parts of water for each part by weight of said sulfur bearing solution; (b) mixing said sulfur-bearing solution with said extracting solvent; and (c) separating a phase comprising the glycolic or alcoholic solvents and water from a phase comprising said water-immiscible hydrocarbon and said sulfur compounds.

The process of this invention may be applied successfully in the removal of sulfur compounds from sulfur-bearing solutions containing glycolic or alcoholic compounds and sulfur compounds to a level substantially below 1 percent by weight of the sulfur compounds in the sulfur-bearing solution.

BRIEF DESCRIPTION OF THE DRAWING

The invention will be more clearly understood upon reference to the discussion below and to the drawing which is a diagrammatic flow sheet illustrating one method of practicing the present invention. The drawing illustrates the use of the solvent extraction process of this invention as a sidestream which removes sulfur compounds from a solvent comprising dialkyl ethers of polyalkylene glycols and which is applied to a process for separating gaseous hydrogen sulfide from gaseous mixtures via physical absorption of the hydrogen sulfide by the glycol solvent.

DESCRIPTION OF THE PREFERRED EMBODIMENT

The extraction solvent of this invention resides in the use of a certain chlorinated saturated or unsaturated hydrocarbon compound, a certain aromatic hydrocarbon compound, a certain chlorinated aromatic hydrocarbon compound, a certain unsaturated oxygen-containing cyclic hydrocarbon compound, or mixtures thereof. Said hydrocarbon compound must have a boiling temperature in the range 50° F to 500° F, preferably 140° to 375° F, be immiscible with water, be relatively highly miscible with said sulfur compounds, and be not inclined to form stable emulsions with water, glycolic or alcoholic solvents, and sulfur compounds. Applicable chlorinated saturated and unsaturated hydrocarbon compounds include saturated and unsaturated hydrocarbons with one to five carbon atoms, preferably one to two carbon atoms, per molecule, and with one to six chlorine atoms, preferably two to four chlorine atoms, per molecule. Illustrations of preferred chlorinated hydrocarbon compounds suitable for use in this invention are trichloroethylene, tetrachloroethylene, trichloroethane, chloroform, and carbon tetrachloride. Applicable aromatic hydrocarbon compounds include those with six to nine carbon atoms, preferably six to seven carbon atoms, per molecule. Illustrative of preferred aromatic hydrocarbon compounds are benzene, toluene, and xylene. Applicable chlorinated aromatic hydrocarbon compounds include those with six to nine carbon atoms, preferably six to seven carbon atoms, per molecule, and with one to three chlorine atoms per molecule. Illustrative of preferred chlorinated aromatic compounds are monochlorobenzene, the dichlorobenzenes, benzyl chloride, benzyl dischloride, and the chlorotoluenes. Applicable unsaturated oxygen-containing cyclic hydrocarbon compounds include those with four to five carbon atoms and one to two oxygen atoms. Illustrative of a preferred unsaturated oxygen-containing cyclic hydrocarbon compound is furan. Since the selection of the ideal water-immiscible hydrocarbon utilized in the extracting solvent of the process of this invention is dependent on its favorable thermal stability properties, its low volatility, and its low flammability, in addition to its boiling range, water immiscibility, resistance to emulsion, and effectiveness in sulfur removal and dissolution, it has been found that trichloroethylene, benzene, toluene, furan, and monochlorobenzene are especially preferred as the water-immiscible hydrocarbon at the conditions normally employed in the present invention.

The extracting solvent of this invention is highly effective and efficient in removing sulfur compounds from sulfur-bearing solution containing alcoholic or glycolic solvents as its principal component when the extracting solvent consists of 0.05 to 1 part of said water-immiscible hydrocarbon and 0.1 to 2 parts of water for each 1 part by weight of the sulfur-bearing solution to be used in the process of this invention. As a preferred embodiment, the present procedure may be most effectively and efficiently performed by utilizing an extracting solvent consisting of 0.15 to 0.40 part of said water-immiscible hydrocarbon and 0.5 to 1.0 part of water. The exact quantitative composition of the extracting solvent is dependent on the chemical nature and percentage by weight of the sulfur compound to be removed from the sulfur-bearing solution.

The principal component of the sulfur-bearing solution to which the solvent extraction process of this invention may be applied successfully has been referred to herein as glycolic or alcoholic solvents. The glycolic or alcoholic solvents having utility in the present process are selected from the class of glycols and alcohols, mixtures thereof, derivatives thereof, and mixtures of derivatives thereof. It is essential that such glycolic or alcoholic solvents have a fluid, nonviscous character, a high immiscibility with water, and a relatively high boiling point such that each glycolic or alcoholic compound remains in substantially liquid phase at the operating conditions of this invention. In general, suitable glycolic compounds include the alkylene glycols, the polyalkylene glycols, and the esters and the ethers of the alkylene and polyalkylene glycols. Typical alkylene glycols in the class of compounds referred to as glycol compounds include ethylene glycol, propylene glycol, butylene glycol, glycerol, trimethylene glycol, and other di-hydroxyl- and tri-hydroxyl-substituted aliphatic compounds containing up to approximately 10 carbon atoms per molecule. Typical polyalkylene glycols include diethylene glycol, triethylene glycol, tetraethylene glycol, and dipropylene glycol. Typical esters of the alkylene glycols and polyalkylene glycols include the formic acid, acetic acid, and propionic acid esters and di-esters of ethylene glycol, polyethylene glycol, propylene glycol, and polypropylene glycol. Typical ethers of the alkylene glycol and polyalkylene glycols include the methyl, dimethyl, ethyl, diethyl, propyl, dipropyl, butyl, and dibutyl ethers of the ethylene, diethylene, triethylene, tetraethylene, pentaethylene, hexaethylene, and heptaethylene glycols. Suitable alcoholic compounds include methyl alcohol, ethyl alcohol, the propyl alcohols, and other dihydroxyl- and tri-hydroxyl-substituted alcohols which are highly miscible with water. The solvent extraction process of this invention has been especially successful in treating sulfur-bearing solution containing a mixture of dimethyl ethers of polyethylene glycols.

The exact composition of the sulfur compounds which are removed from the sulfur-bearing solution by the extracting solvent is not completely known. It is believed that the sulfur compounds are the oxidation products of sulfur compounds present in the natural gas or substituted natural gas feed mixtures. These gas feed mixtures are used in conventional processes which remove hydrogen sulfide from said gas mixtures. Typical sulfur compounds which are removed from the sulfur-bearing solution include organic polysulfides, hydrogen polysulfides, elemental sulfur, alkyl disulfides, and mercaptans. It has been found that the present procedure may be effectively carried out when the sulfur content of the sulfur-bearing solution ranges from 0.1 to 30 percent by weight of the sulfur-bearing solution. Accordingly, the process of this invention is further advantageous because of its superior flexibility in removing specific amounts of sulfur compounds by weight from solutions containing the sulfur compounds and the glycolic or alcoholic solvents.

Generally, all steps of the present invention, i.e., contacting, mixing, and phase separation, may be performed in conventional solvent extraction equipment. For example, continuous countercurrent multi-staged or column solvent extraction equipment may be used. Since the extracting solvent and the sulfur-bearing solution which are used in the present solution are generally not corrosive, the equipment may be made of conventional carbon steel or other similar suitable material.

Contacting, mixing, and phase separating of the extracting solvent and the sulfur-bearing solution may be effected within a wide range of pressures or temperatures. However, pressures and temperatures should be used which are practical, i.e., compatible with the overall economic operation of the present process. For example, pressures between 5 psia and 100 psia and temperatures between 50° F and 200° F, preferably ambient pressures and temperatures of 70° F to 150° F, may be used.

Mixing of the extracting solvent with the sulfur-bearing solution is performed until intimate physical union of the extracting solvent with the sulfur-bearing solution is effected.

For purposes of illustration only, a mixing time of 10 to 15 minutes is normally adequate for achieving the desired union of extracting solvent with sulfur-bearing solution, up to total mixing quantities of approximately 1,000 gallons.

Thereafter, the completely mixed extracting solvent and sulfur-bearing solution settle in a suitable vessel for a time which is sufficient for two phases to separate. The time after mixing to complete phase formation is primarily dependent on the total volume of extracting solvent and sulfur-bearing solution involved in separation of the two phases. Separation times of 5 minutes to 4 hours may be used. For convenience, the phase comprising glycolic or alcoholic solvents and water is hereinafter designated as the extract phase. The phase comprising water-immiscible hydrocarbon and sulfur compounds is hereinafter designated as the raffinate phase.

As a preferred embodiment, the present invention may be effectively carried out by utilizing a continuous countercurrent three-stage solvent extraction system as hereinafter described in greater detail. With such a solvent extraction system, sulfur compounds may be removed economically and efficiently from sulfur-bearing solutions. It was found that such a multi-stage system was more effective than a column solvent extraction system for removing sulfur compounds from sulfur-bearing solution because the column system exhibited a greater tendency to form emulsions.

In accordance with the preferred embodiment, regeneration of the water-immiscible hydrocarbon from the raffinate phase and regeneration of the glycolic or alcoholic solvents from the extract phase are readily accomplished by distillation. Accordingly, loss of water-immiscible hydrocarbon and of glycolic or alcoholic solvents through usage of the present invention is minimal, and thus another economic advantage of this invention is realized.

Essential to the large capacity of the present invention to remove sulfur compounds from sulfur-bearing solution is the quantitative ratio of the water-immiscible hydrocarbon to water within the extracting solvent. The water-immiscible hydrocarbon portion of the extracting solvent, consisting of 0.05 to 1 part of carbon compound per 1 part of sulfur-bearing solution, is essential in extracting the sulfur compounds from the sulfur-bearing solution and in being nonmiscible with solutions comprising glycolic or alcoholic solvents and water. The water portion, consisting of 0.1 to 2 parts of water per 1 part of sulfur-bearing solution, is essential in extracting the glycolic or alcoholic solvents from the sulfur-bearing solution and in substantially reducing the solubility of sulfur compounds in the glycolic or alcoholic solvents. The exact proportion of water to be used in the extracting solvent is dependent on the proportion of water that may be present in the sulfur-bearing solution. The extraction capabilities of the water-immiscible hydrocarbon combines with the extraction capabilities of water to form a superior extracting solvent which, when utilized in the amount specified in this invention, assures an efficient, simple, and economical means of removing sulfur compounds from sulfur-bearing solutions. The preferred extracting solvent proportions of 0.15 to 0.40 part water-immiscible hydrocarbon and 0.5 to 1.0 part water for each part of sulfurbearing solution assures a more efficient, simpler, and more economic means of removing sulfur compounds from sulfur-bearing solution. Removal of sulfur compounds from sulfur-bearing solutions using ratios outside those disclosed in this invention is undesirable because high efficiency of sulfur compound removal and low economy are not realized.

The solvent extraction process of this invention may be applied to any field which requires removal of sulfur compounds from a solution comprising alcoholic or glycolic solvents. One specific application to which the present invention may be applied is in the sidestream removal of sulfur compounds in a process which employs a solvent comprising dialkyl ethers of polyalkylene glycols. Said process involves the removal of hydrogen sulfide from gas mixtures containing the same. As the sidestream in such a process, the present invention has proved advantageous in regenerating the glycol solvent by removing substantially all of the sulfur compounds and thus in increasing the efficiency of hydrogen sulfide removal therein. In addition, the compactness of the solvent extraction process of this invention makes it suitable for use as such a sidestream.

As a preferred embodiment for practicing this invention, the aforementioned sidestream may be applied before, or preferably after, the stripping zone of the processes which are claimed and described in U.S. Pat. No. 3,362,133 issued Jan. 9, 1968 and U.S. Pat. No. 3,533,732 issued Oct. 13, 1970. Reference to the flow diagram of the accompanying drawing illustrates the application of the present invention as a sidestream after the stripping zone of an applicable process.

Referring to the drawing, one part by weight of sulfur-bearing solution comprising a glycolic or alcoholic solvent as a principal component enters through line 3 at the top of mixer 4 in a three-stage solvent extraction system. In accordance with the preferred embodiment, the sulfur-bearing solution is pumped through sidestream 3 from line 26 of a process for removing hydrogen sulfide from gaseous mixtures through the use of a physical solvent such as a dialkyl ether of a polyalkylene glycol. The sulfur-bearing solution in line 3 may be fed from line 26 at a rate which is at least 1 percent of the rate of solution in line 26, with the preferable range being 1 to 20 percent of the normal flow rate of 5 to 35 gallons/(minute)(sq.ft.) in line 26. Sulfur content of the sulfur-bearing solution is about 0.1 to 30 percent of the solution, with a preferred range being 0.5 to 10 percent. Approximately 0.05 to 1 part of a water-immiscible hydrocarbon enters mixer 4 through line 1, with 0.15 to 0.40 part preferred. Although the water-immiscible hydrocarbon is recycled material, it may be regenerated to substantially its original purity by means of distillation. Approximately 1 to 25 percent of the specified 0.1 to 2 parts of water enters mixer 4 through line 3, with 0.5 to 1.0 part preferred. Although temperature, pressure, and incoming flow rates are not critical to this invention, it is preferred that the composite solution in the mixer is at a temperature ranging from 70° to 150° F in order that no degradation of feed components occurs. In mixer 4 the sulfur-bearing solution, the water-immiscible hydrocarbon, and the water are mixed as feed components, preferably for about 10 to 15 minutes.

Thereafter, the feed components pass through line 5 to settler 6. After passage of a suitable time, in the range 5 to 240 minutes, the separation of two phases is effected. The lower phase is pumped to mixer 8 through line 7. The solution in mixer 8 is mixed, passed through line 9 and is permitted to form two phases in settler 10. The upper phase in settler 10 is pumped through line 11 to mixer 4. The lower phase in settler 10 is pumped through line 12 to mixer 14. In mixer 14 the remainder of the 0.1 to 2 parts of water not added to mixer 4 enters mixer 14. The solution in mixer 14 is mixed, passed through line 15, and is permitted to form two phases in settler 16. The upper phase is pumped through line 17 to mixer 8.

The process is continued within this three-stage solvent extraction system until substantially all of one phase is present in settler 6 and substantially all of the other phase remains in settler 16. For purposes of this illustration the extract phase which is composed, at this point in the process, substantially all of glycolic or alcoholic solvent and water will be assumed to be the lighter phase (settler 6). Correspondingly the raffinate phase which is composed, at this point in the process, substantially all of the water-immiscible hydrocarbon and sulfur compounds will be assumed to be the heavier phase (settler 16). The raffinate phase in settler 16 is pumped through line 18 to a distillation system 20 to effect intraphase separation therein. The water-immiscible hydrocarbon, which is produced as distillate within distillation system 20, passes through line 1 and is available as recycle material to be metered in mixer 4 for reutilization in the solvent extraction system. The sulfur compounds which are isolated from the water-immiscible hydrocarbon within distillation system 20 leaves through line 21. The extract phase in settler 6 is pumped through line 19 to another distillation system 22 to effect intraphase separation therein. Water, which is isolated from the glycolic or alcoholic solvent within the distillation system 22, passes to line 2 and is available as recycle material to be metered via line 2 through mixer 4 or mixer 13. The sulfur-compound-free glycolic or alcoholic solvent, which is isolated within distillation system 22, is recycled to line 26 via line 25 for reuse as regenerated physical solvent.

The physical solvent is fed from line 26 into cooler 27 and throgh line 38 to the top try of an absorption column 28. A gaseous mixture containing hydrogen sulfide enters through line 29 at the bottom of the countercurrent absorption column 28 at a rate of about 0.1 to 3.0 pounds of liquid solvent per standard cubic foot of hydrogen sulfide and other gases to be absorbed. The absorption column can be operated at pressures in the range 150 to 1,500 psia. The incoming solvent temperature is maintained at about 0° to 120° F, with 40° to 65° F preferred. The solvent discharged from the bottom of the absorption column is at a temperature in the range of 5° to 160° F, with 50° to 100° F preferred, and contains up to 20 percent hydrogen sulfide by weight. Gas effluent leaving the top of absorber 28 through line 30 will be essentially sulfur-free. The solvent discharged from the absorber through line 31 is flashed in flashing tank 32 which operates at a pressure less than that in the absorber, usually 15 to 500 psia. The gas through line 33 from the flashing operation contains process gas and inerts which are recycled to the absorber 28. Practically all of the hydrogen sulfide remains in the effluent solvent passing through line 34. The solvent then passes to stripper 35 which can be operated at atmospheric or lower pressures, with 2 to 18 psia preferred. Solvent flows downward through the stripper 35 and cools as dissolved gases are desorbed. Solvent temperature at the base of the stripper should be at least 100° F. Air is fed through line 36 at the base of the stripper at a rate of about b 0.2 to 2.0 standard cu.ft. air/lb. of solvent fed to the stripper. The stripping air oxidizes residual solvent and thereby lowers hydrogen sulfide in the solvent to preferably 1 to 20 ppm. Effluent gas containing hydrogen sulfide and air is passed via line 37 to a subsequent processing step for sulfur recovery or disposal. The desorbed solvent is then passed through line 26 wherein a portion of the solvent is recycled to absorption tower 28 via cooler 27 and a portion is passed through line 3 to the solvent extraction system of this invention.

The following examples are provided as further illustrative of the present invention. The enumeration of details therein, however, should not be considered as being restrictive of the scope of the invention.

EXAMPLE 1

Sulfur-bearing solution comprising 99.15 parts by weight of a mixture of dimethyl ethers of polyethylene glycol and 0.65 part by weight of sulfur compounds enters mixer 4 through line 3. The temperature of the incoming sulfur-bearing solution was 90° F. Thereafter, stripping is begun while 30.0 parts by weight of trichloroethylene is added to mixer 4 through line 1. Stirring is continued for 5 minutes so as to assure complete mixing. Thereafter the components of mixer 4 pass through line 5 to settler 6. After a settling time of 10 minutes, the lower phase, which is the raffinate phase in this example, is pumped to mixer 8 through line 7. As in mixer 4, the components in mixer 8 are stirred for 5 minutes, passed through line 9, and are permitted to settle for 10 minutes in settler 10. The upper phase of settler 10, which is the extract phase in this example, is pumped through line 11 back to mixer 4. The raffinate phase of settler 10 is passed through line 12 to mixer 14. In mixer 14, 100 parts of water is added while stirred with said raffinate phase from settler 10. Stirring time in mixer 14 is 10 minutes. Thereafter, the components of mixer 14 are passed through line 15 and permitted to settle for 10 minutes in settler 16. The extract phase is pumped through line 17 to mixer 8.

After the phases are recycled three times in a manner as described in the preceding paragraph, the extract phase in settler 6 consists of 97.35 parts of said glycol compound, 100.1 parts of water, and 0.15 part of sulfur compounds. Furthermore, the raffinate phase in settler 16 consists of 29.0 parts trichloroethylene, 1.8 parts glycol compound, 0.1 part water, and 0.5 part sulfur compounds. The extract phase in settler 6 is pumped through line 19 to a distillation column 22 wherein all of the water is separated from the glycol compound which contains 0.15 part sulfur compounds. Thereafter, the regenerated glycol compound is available for immediate return to its desired function as a physical solvent. In addition, the raffinate phase in settler 16 is pumped through line 18 to another distillation column 20 wherein complete intraphase separation of water-immiscible hydrocarbon and sulfur compounds is performed.

EXAMPLE 2

A sulfur-bearing solution consisting of 8,300 pounds (approximately 1,000 gallons) of dimethyl ethers of polyethylene glycol (2.2 percent sulfur content by weight) is added to a mixer. Then 2,600 pounds (approximately 225 gallons) trichloroethylene are added to the mixer while stirred with the sulfur-bearing solution. Thereafter, 8,300 pounds (approximately 1,000 gallons) water are added to the mixer. Stirring of all components in the mixer is continued for 10 minutes at a temperature of about 125° F. Subsequent to stirring, the mixed components are passed into a settler. After settling for 2 hours, two distinct phases form. The upper, extract phase comprises a solution of water and said glycol with a total sulfur content of 0.07 percent by weight, or 0.14 percent based on recovered glycol having 4.5 percent water. The lower, raffinate phase is comprised of trichloroethylene and substantially all the sulfur compounds.

EXAMPLE 3

A sulfur-bearing solution comprising 100 grams of a mixture of dimethyl ethers of polyethylene glycol (sulfur content of 2.2 percent, of which approximately 0.5 percent was elemental sulfur) is added to a mixer. Then 30 grams trichloroethylene is added to the mixer while stirred with the sulfur-bearing solution. Immediate dissolution of the glycol solution and the trichloroethylene is observed. Thereafter, 100 grams of water is added to the mixer. Stirring of all components of the mixer is continued for 10 minutes. Subsequent to stirring, the mixed components are passed into a settler. After settling for 15 minutes at 75° F, two distinct phases form. The upper, extract phase comprises a water-glycol solution with a 0.13 percent total sulfur content or a 0.26 percent total sulfur content based on water-free, recovered glycol. The lower, raffinate phase is comprised of trichloroethylene and substantially all the sulfur compounds.

EXAMPLE 4

Example 4 is continued at the same conditions as in Example 3, except that 30 grams carbon tetrachloride is added in place of the 30 grams trichloroethylene. The resultant upper, extract phase comprises a water-glycol solution with a 0.16 percent total sulfur content or a 0.32 percent total sulfur content based on water-free recovered glycol. The lower, raffinate phase is comprised of trichloroethylene and substantially all the sulfur compounds.

EXAMPLE 5

Example 5 is continued at the same conditions as in Example 3, except that 100 grams of dimethyl ethers of polyethylene glycol (2.7 percent sulfur content), 20 grams furan, and 50 grams water are added in place of the components which are added in Example 3. The resultant lower, extract phase comprises a water-glycol solution with a 0.35 percent total sulfur content, or a 0.54 percent total sulfur content based on water-free, recovered glycol. The upper, raffinate phase is comprised of furan and substantially all the sulfur compounds.

EXAMPLE 6

Example 6 is continued at the same conditions as in Example 3, except that 100 grams of a mixture of dimethyl ethers of polyethylene glycol (2.0 percent sulfur content), 30 grams toluene, and 100 grams water are added in place of all the components which are added in Example 3. The resultant upper, extract phase comprises a water-glycol solution with a 0.085 percent total sulfur content, or a 0.17 percent total sulfur content based on water-free recovered glycol. The lower, raffinate phase is comprised of toluene and substantially all the sulfur compounds.

EXAMPLE 7

Example 7 is continued at the same conditions as in Example 3, except that 100 grams of propylene glycol (11.1 percent sulfur), 50 grams monochlorobenzene, and 110 grams water are added in place of all the components which are added in Example 3. The resultant upper, extract phase is comprised of a water-glycol solution with a total sulfur content of less than 1 percent based on water-free recovered glycol. The lower, raffinate phase is comprised of monochlorobenzene and substantially all the sulfur compounds.

EXAMPLE 8

In tests similar to Example 3, 100 grams of ethyl alcohol (with sulfur contents ranging from 2 percent to 15 percent by weight) is added in place of 100 grams of the glycol mixture. At the end of each test, the resulting raffinate phase is comprised of trichloroethylene and substantially all of the sulfur compounds. The extract phase is comprised of water and ethyl alcohol, wherein the sulfur content in the ethyl alcohol is capable of being reduced to a level of 1/30 of the sulfur compound by weight present prior to testing.

EXAMPLE 9

In test similar to Example 3, a mixture of 70 grams of an acetic acid monoester of ethylene glycol and 30 grams of isopropyl alcohol (with sulfur contents ranging from 2 to 15 percent by weight of the mixture) is added in place of 100 grams of the glycol mixture. Results similar to Example 8 are obtained.

Various modifications will be apparent to one skilled in the art, and it is not intended that this invention be limited to details presented by way of illustration, except as required by express limitations in the appended claims.

What is claimed is:

1. A solvent extraction process which comprises the steps of (a) contacting a sulfur-bearing solution of sulfur compounds selected from the group consisting of organic polysulfides, hydrogen polysulfides, elemental sulfur, alkyl disulfides, mercaptans and mixtures thereof in solvents selected from the class of glycols and alcohols, mixtures thereof, derivatives thereof, and mixtures of derivatives thereof, with an extracting solvent consisting of (1) 0.05 to 1.0 part for each part by weight of sulfur-bearing solution of a water-immiscible liquid hydrocarbon having a boiling temperature in the range 50° F. to 500° F. and a relatively high miscibility with said sulfur compounds, wherein said water-immiscible hydrocarbon is selected from the group consisting of chlorinated saturated and unsaturated hydrocarbons, aromatic hydrocarbons, chlorinated aromatic hydrocarbons, unsaturated oxygen-containing cyclic hydrocarbons and mixtures thereof, and (2) 0.1 to 2.0 parts of water for each part by weight of sulfur-bearing solution; (b) mixing said sulfur-bearing solution with said extracting solvent; and (c) separating a liquid phase comprising said glycolic and/or alcoholic solvents and water from a liquid phase comprising said water-immiscible hydrocarbon and said sulfur compounds.

2. The process of claim 1, wherein the boiling temperatures of said water-immiscible hydrocarbon ranges from 140° F to 375° F.

3. The process of claim 1, wherein the extracting solvent comprises 0.15 to 0.40 part by weight of said water-immiscible hydrocarbon and 0.5 to 1.0 part by weight of said water.

4. The process of claim 1, wherein the water-immiscible hydrocarbon is selected from the group consisting of trichloroethylene, benzene, toluene, furan, monochlorobenzene, or mixtures thereof.

5. The process of claim 1, wherein said glycol compound is a dialkyl ether of a polyalkylene glycol or mixtures thereof.

6. A process for removing hydrogen sulfide from a gaseous mixture containing hydrogen sulfide and for removing sulfur compounds selected from the group consisting of organic polysulfides, hydrogen polysulfides, elemental sulfur, alkyl disulfides, mercaptans and mixtures thereof from sulfur-bearing solutions comprising normally liquid dialkyl ethers of polyalkylene glycols as a principal component, said process comprising the steps of:

a. contacting said gaseous mixture in a first zone with 0.1 to 3.0 pounds of liquid solvent per standard cubic foot of gas to be absorbed, the liquid solvent comprising dialkyl ethers of polyalkylene glycols, to effect absorption of substantially all of the hydrogen sulfide and a minor portion of other gases;

b. passing the liquid solvent containing the absorbed hydrogen sulfide to a second zone maintained at a pressure substantially lower than that in the first zone to effect liberation of the other gases;

c. withdrawing from said second zone the gases liberated therein;

d. withdrawing said solvent from said second zone;

e. passing an oxygen-containing gas in contact with said solvent containing hydrogen sulfide in a stripping zone which is maintained under conditions such that the glycol will be at least 100° F. when it reaches the base of said stripping zone, to effect removal of substantially all of the hydrogen sulfide therefrom;

f. withdrawing said glycol solvent from said stripping zone;

g. contacting in a third zone one part of said stripping zone solvent comprising said dialkyl ethers of polyalkylene glycols and said sulfur compounds with an extracting solvent consisting of 0.05 to 1.0 part for each part by weight of said stripping zone solvent of a water-immiscible liquid hydrocarbon compound having a boiling temperature in the cyclic range 50° F. to 500° F. and a relatively high miscibility with said sulfur compounds, wherein said water-immiscible hydrocarbon is selected from the group consisting of chlorinated saturated and/or unsaturated hydrocarbons, aromatic hydrocarbons, chlorinated aromatic hydrocarbons, unsaturated oxygen-containing cyclic hydrocarbons, and mixtures thereof, and 0.1 to 2.0 parts of water for each part by weight of said stripping zone solvent;

h. mixing said stripping zone solvent with said extracting solvent;

i. separating a liquid phase comprising said dialkyl ethers of polyethylene glycols and water from a liquid phase comprising said water-immiscible carbon compound and said sulfur compounds;

j. dissociating said dialkyl ethers of polyethylene glycols from said water;

k. withdrawing said glycol from said third zone; and l. returning said glycol to the top of said first zone for further contact with the gaseous mixture.

7. The process of claim 6, wherein steps (g) through (k) serve as a sidestream to said process, which sidestream is a solvent extraction process for removing said sulfur compounds from a solution comprising said glycol and said sulfur compounds.

8. In a process for removing hydrogen sulfide from a gaseous mixture containing hydrogen sulfide, which process comprises the steps of:

a. contacting said gaseous mixture in a first zone with 0.1 to 3.0 pounds of liquid solvent per standard cubic foot of gas to be absorbed, the liquid solvent comprising dialkyl ethers of polyalkylene glycols, to effect absorption of substantially all of the hydrogen sulfide and a minor portion of other gases;

b. passing the liquid solvent containing the absorbed hydrogen sulfide to a second zone maintained at a pressure substantially lower than that in the first zone to effect liberation of the other gases;

c. withdrawing from said second zone the gases liberated therein;

d. withdrawing said solvent from said second zone;

e. contacting said solvent with an oxygen-containing gas in a stripping zone which is maintained under conditions such that said solvent will be at least 100° F. when it reaches the base of said stripping zone, to effect removal of substantially all of the hydrogen sulfide therefrom; and f. returning said solvent essentially free of hydrogen sulfide to the top of said first zone for further contact with the gaseous mixture; the improvement comprising the use of a solvent extraction process as a sidestream for the removal of sulfur compounds selected from the group consisting of organic polysulfides, hydrogen polysulfides, elemental sulfur, alkyl disulfides, mercaptans and mixtures thereof from said solvent, extraction process comprises the steps of (1) contacting said solvent containing sulfur compounds, with 0.05 to 1.0 part for each part by weight of said solvent of an extracting solvent comprising a water-immiscible liquid hydrocarbon compound having a boiling temperature in the range 50° F. to 500° F. and a relatively high miscibility with said sulfur compounds, wherein said water-immiscible hydrocarbon is selected from the group consisting of chlorinated saturated, and/or unsaturated hydrocarbons, unsaturated oxygen-containing cyclic hydrocarbons, and mixtures thereof, and 0.1 to 2.0 parts of water for each part by weight of said solvent; (2) mixing said solvent with said extracting solvent; and (3) separating a liquid phase comprising said solvent and water from a liquid phase comprising said water-immiscible hydrocarbon and said sulfur compounds.

9. The process of claim 8, wherein said improvement is added as a sidestream between said step (d) and said step (e).

10. The process of claim 8, wherein said improvement is added as a sidestream between said step (e) and said step (f).

* * * * *

PO-1050
(5/69)

UNITED STATES PATENT OFFICE
CERTIFICATE OF CORRECTION

Patent No. 3,831,348                    Dated October 23, 1974

Inventor(s) Geza Pap

It is certified that error appears in the above-identified patent and that said Letters Patent are hereby corrected as shown below:

The Specification and claims have been checked against our application and the following errors have been found:

Column 1, line 12, "beaning" should read --bearing--.

Column 2, line 68, "containg" should read --containing--.

Column 3, line 26, "dischloride" should read --dichloride--.

Column 6, line 6, "sulfurbearing" should read --sulfur-bearing--.

Column 7, line 49, "throgh" should read --through--.

Column 8, line 10, "b" should be omitted.

Claim 6, column 11, line 56, "one part of" should be omitted.

Claim 6, column 11, line 62, "cyclic" should be omitted.

Claim 6, column 12, line 9, "ethers" should read --ether--.

Claim 8, column 12, line 54, "said solvent, extraction" should read --said solvent, which solvent extraction--.

Signed and sealed this 31st day of December 1974.

(SEAL)
Attest:

McCOY M. GIBSON JR.                     C. MARSHALL DANN
Attesting Officer                       Commissioner of Patents